United States Patent [19]

Ikemori et al.

[11] Patent Number: 5,576,779
[45] Date of Patent: Nov. 19, 1996

[54] CAMERA SYSTEM

[75] Inventors: Keiji Ikemori; Yoshinori Itoh, both of Kanagawa-ken, Japan

[73] Assignee: Canon Kabushiki Kaisha, Tokyo, Japan

[21] Appl. No.: 320,555

[22] Filed: Oct. 11, 1994

Related U.S. Application Data

[63] Continuation of Ser. No. 3,873, Jan. 11, 1993, abandoned, which is a continuation of Ser. No. 526,596, May 22, 1990, abandoned.

[30] Foreign Application Priority Data

May 25, 1989 [JP] Japan ..................................... 1-132192

[51] Int. Cl.$^6$ ........................................................ G03B 3/00
[52] U.S. Cl. ........................................... 396/79; 396/379
[58] Field of Search ........................... 354/199, 200, 354/201, 222; 351/195.12

[56] References Cited

U.S. PATENT DOCUMENTS

| | | | |
|---|---|---|---|
| 4,072,971 | 2/1978 | Kuboshima | 354/201 |
| 4,583,831 | 4/1986 | Harvey | 354/195.1 X |
| 4,652,104 | 3/1987 | Harvey | 354/222 X |
| 4,781,446 | 11/1988 | Tanaka et al. | 350/426 |
| 4,830,477 | 5/1989 | Takahashi et al. | 354/222 |
| 4,865,434 | 9/1989 | Matsushita et al. | 354/222 |
| 4,909,614 | 3/1990 | Itoh et al. | 354/222 |
| 4,944,030 | 7/1990 | Haraguchi et al. | 354/199 X |
| 5,162,946 | 11/1992 | Yamaguchi | 359/676 |

FOREIGN PATENT DOCUMENTS 62-209425  9/1987  Japan.

*Primary Examiner*—Michael L. Gellner
*Assistant Examiner*—Nicholas J. Tuccillo
*Attorney, Agent, or Firm*—Fitzpatrick, Cella, Harper & Scinto

[57] ABSTRACT

A camera system comprising a photographic lens having a plurality of lens units movable along a photographic optical axis when zooming, and a finder optic having a plurality of lens units movable along a finder optical axis when zooming, wherein the amounts of zooming movement of at least one of the lens units of the photographic lens and at least one of the lens units of the finder optic are the same.

8 Claims, 12 Drawing Sheets

STOP

EYE POINT

FOCUSING

SPHERICAL ABERRATION SINE CONDITION | ASTIGMATISM | DISTORTION(%)

SPHERICAL ABERRATION SINE CONDITION | ASTIGMATISM | DISTORTION(%)

5,576,779

CAMERA SYSTEM

This application is a continuation of application Ser. No. 08/003,873 filed Jan. 11, 1993, which is a continuation of application Ser. No. 07/526,596 filed May 22, 1990; both now abandoned.

BACKGROUND OF THE INVENTION

1. Field of the Invention

This invention relates to camera systems having a finder system of the external type provided independently of a photographic system and, more particularly, to camera systems having a finder system of the external type having a magnification varying means which is operatively associated with a magnification varying means of the photographic system of a photographic camera or a video camera, wherein a lens group constituting part of the finder system is made to move in unison with a lens group constituting part of the photographic system, thereby achieving simplification of the lens barrel.

2. Description of the Related Art

In the finder system arranged in independent relation to the photographic system as in the so-called lens shutter camera, or the external type finder system, it has been the common practice that when the photographic system has a zooming means, the finder system, too, is provided with a magnification varying means which is operatively associated With the zooming means of the photographic system.

By this, the image to be photographed within a frame on the photosensitive surface is made to coincide with the object image observed in the field of view of the finder.

There have been many previous proposals for using the magnification varying means in the finder system and carrying out variation of the magnification of the finder image in automatic response to zooming of the photographic system, or for such a magnification variable finder of the external type.

In general, the camera system that affords the finder system of the external type having the magnification varying means is relatively easy to facilitate minimization of the size of the photographic system. To drive the operating mechanism for the finder system in predetermined coordination with the zoom control mechanism of the photographic system, however, a problem arises that the operating mechanism becomes very complicated in structure.

Particularly when the zoom ratio is increased, the complexity of the control mechanism for coordinating the finder system with the photographic system tends to increase.

By the way, Japanese Laid-Open Patent Application No. Sho 62-209425 has proposed a technique wherein the photographic lens and the magnification variable finder optical system have a common cam frame made with camming slots for the photographic lens cut therein to form a locus of motion of the photographic lens and with camming slots cut therein to form a locus of motion of the finder optical system, or to be solely used for the finder.

However, to allow the provision of both types of camming slots for the photographic lens and the finder optical system to be made, all the camming slots must be designed so as not to cross one another. In addition, on manufacturing it, a few problems will arise.

SUMMARY OF THE INVENTION

The present invention has a general object to provide a camera system having a finder system of the external type arranged independently of the photographic system, wherein the zoom part or focus part of the photographic system and the zoom part or focus part of the finder system are moved in coordinating relation by drive means, whereby the complexity of structure of the coordination control mechanism is prevented from increasing, thus realizing a simple form of the camera system despite the use of the finder system of the external type.

Figure 1A:
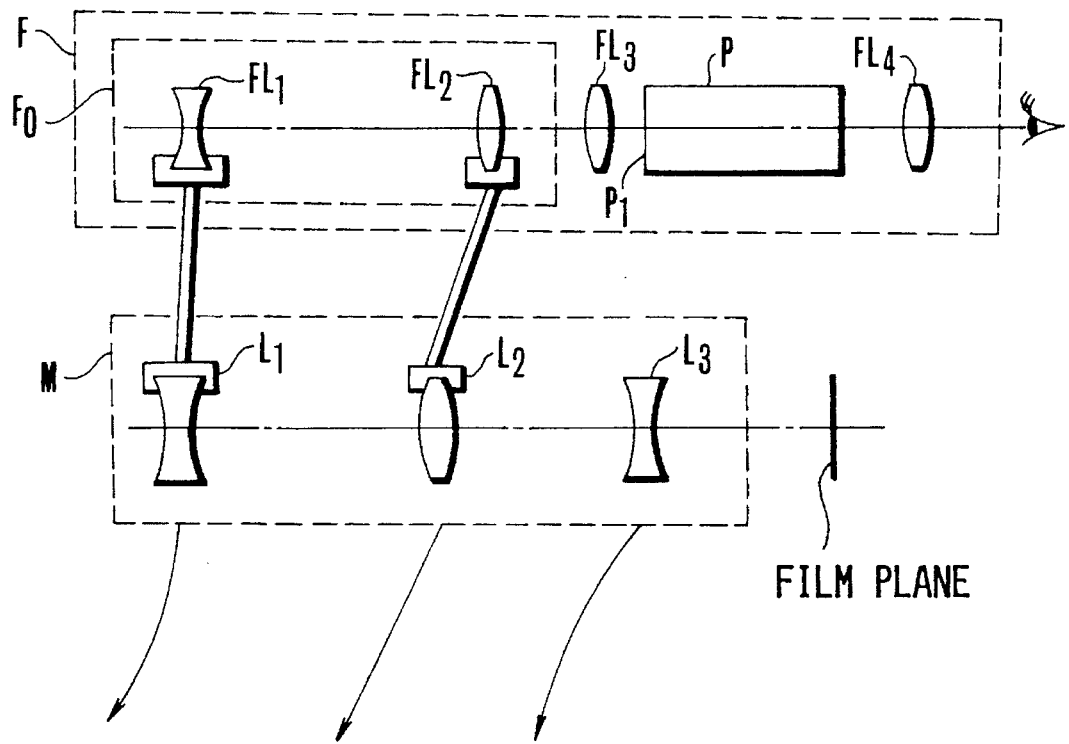
FIGS. 1(A), 1(B) and 1(C) are schematic views of the main parts of first, second and third embodiments of an optical system according to the invention respectively.

Of the graphs of the aberrations, the ones whose numbers are appended a suffix (A) are in the wide-angle end, and the others whose numbers are appended a suffix (B) are in the telephoto end.

In the drawings, reference symbol M denotes the photographic system, F denotes the finder system, L1 and FL1 each denote the first lens unit, L2 and FL2 each denote the second lens unit, L3 denotes the third lens unit, F0 denotes the objective lens, P denotes the porro-prism, FL3 denotes the field lens, FL4 denotes the eyepiece lens, P1 denotes the first focal plane and P2 denotes the second focal plane. Reference numeral 21 represents the secondary image forming system.

DETAILED DESCRIPTION OF THE PREFERRED EMBODIMENTS

Figure 1B:
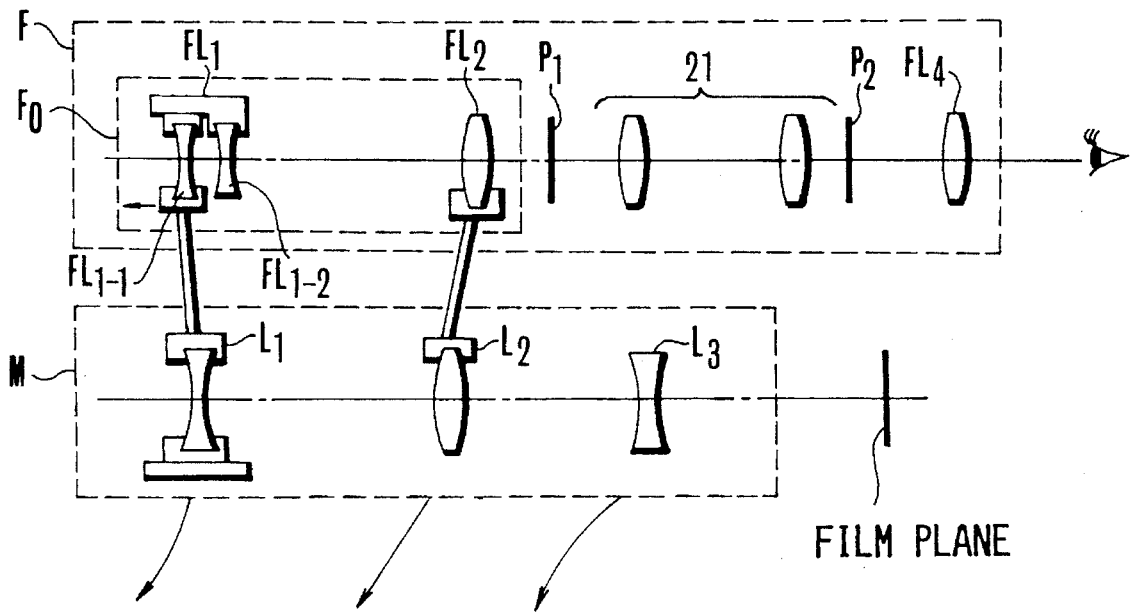
Figure 1C:
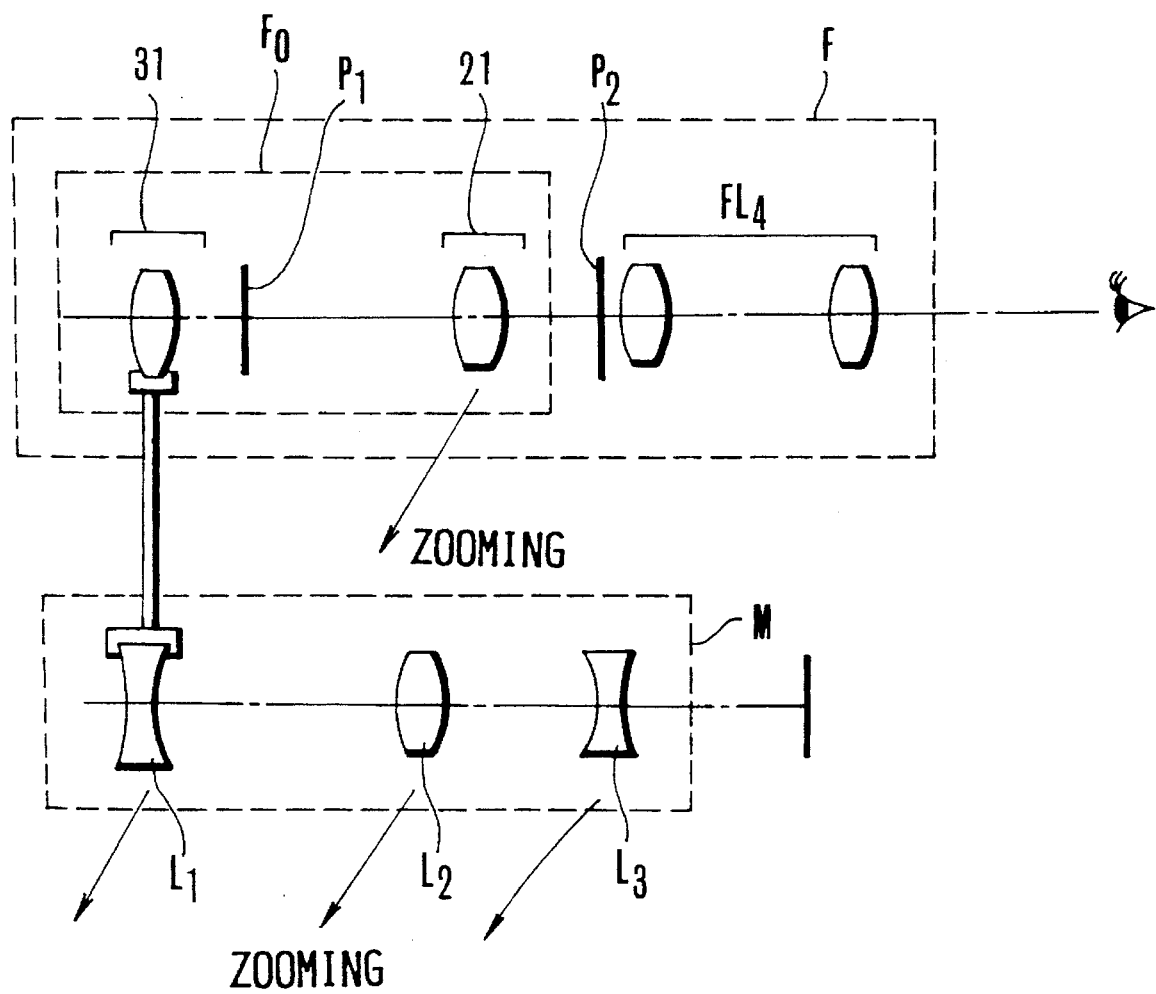
Figure 2A:
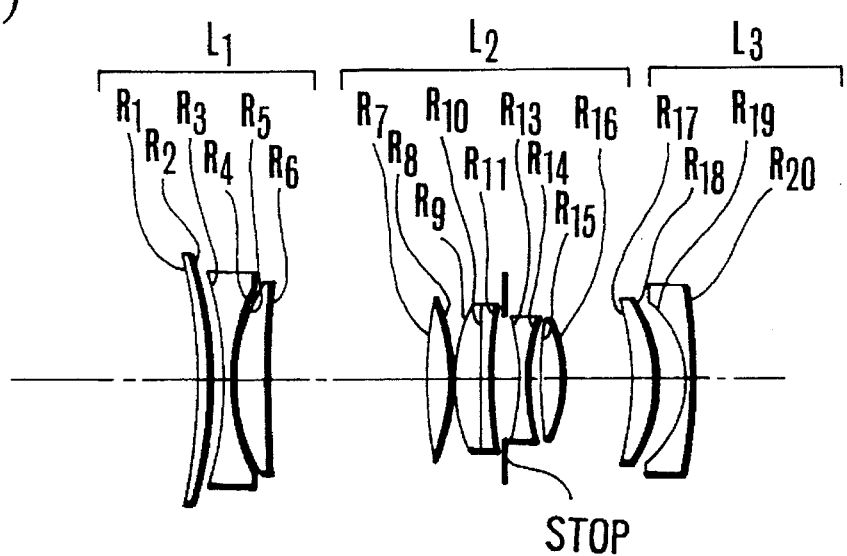
FIGS. 2(A) and 2(B) and FIGS. 5(A) and 5(B) are longitudinal section views of examples 1 and 4 of specific photographic systems of the invention respectively.
Figure 2B:
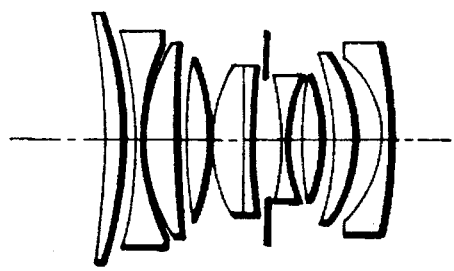
Figures 3A, 3B:
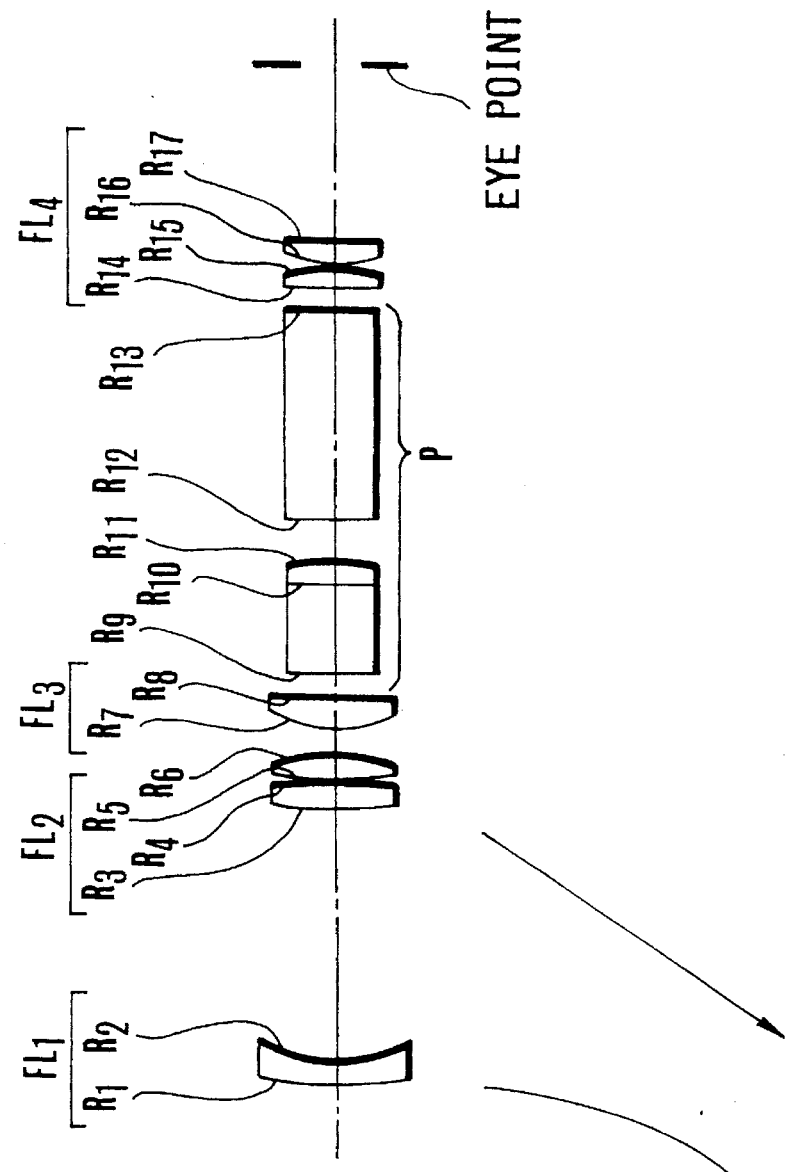
FIGS. 3(A) and 3(B), FIGS. 4(A) and 4(B) and FIGS. 6(A) and 6(B) are longitudinal section views of examples 2, 3 and 5 of specific finder systems of the invention respectively.
Figure 4A:
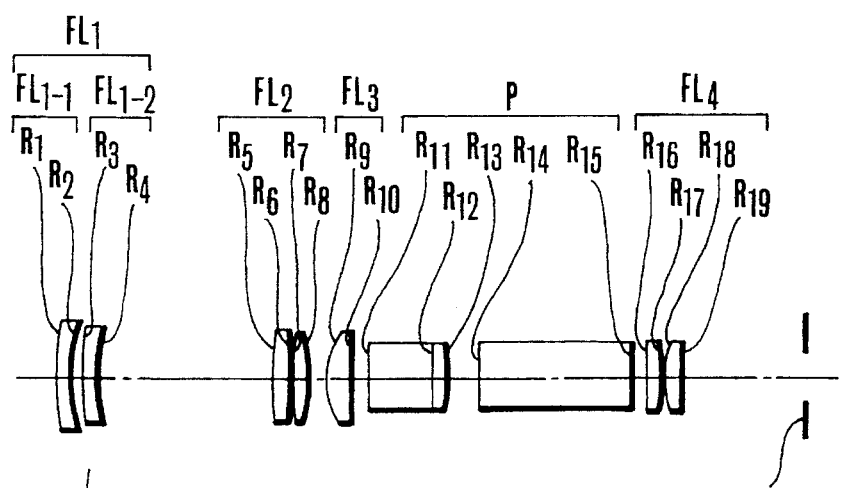
Figure 4B:
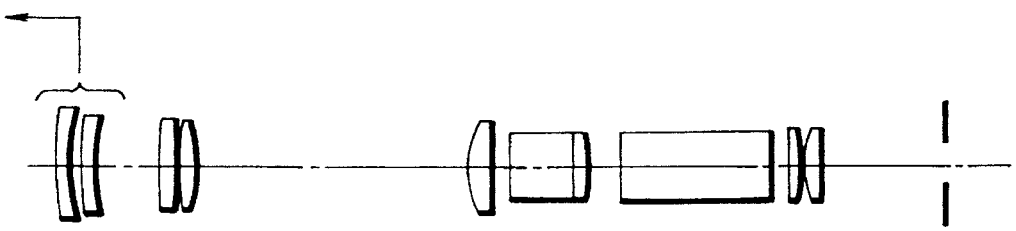
Figure 5A:
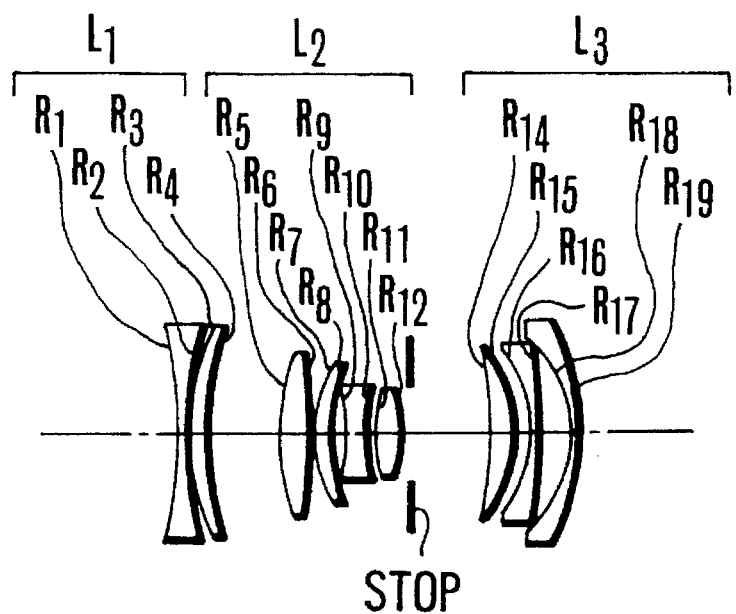
Figure 5B:
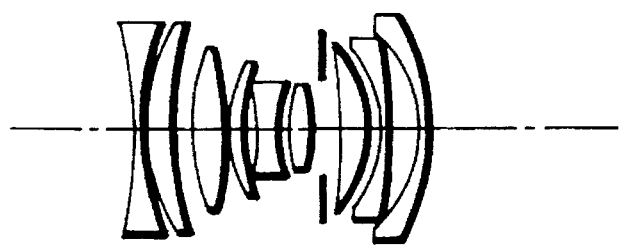
Figure 6A:
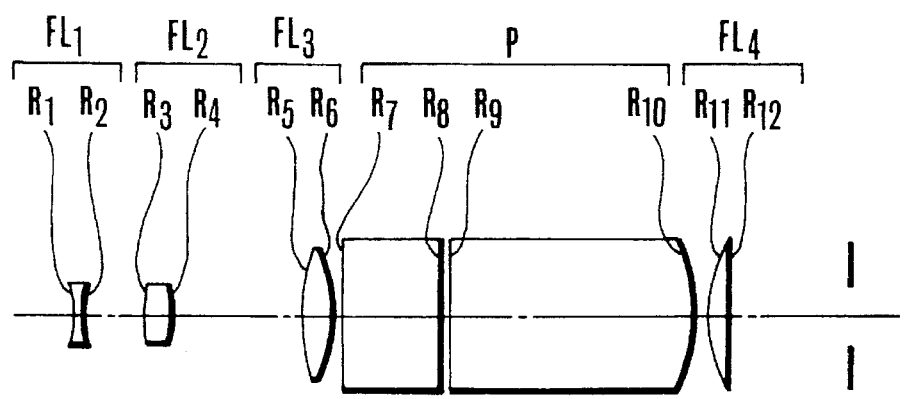
Figure 6A:
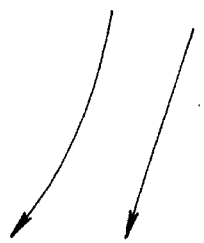
Figure 6B:
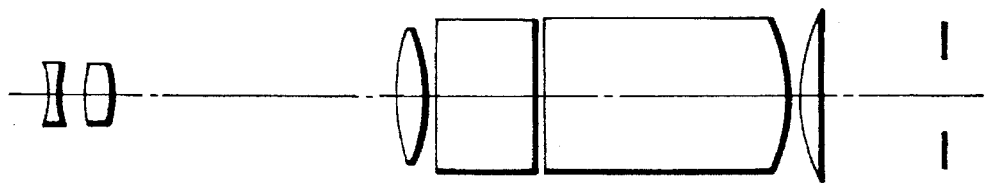
Figure 7A:
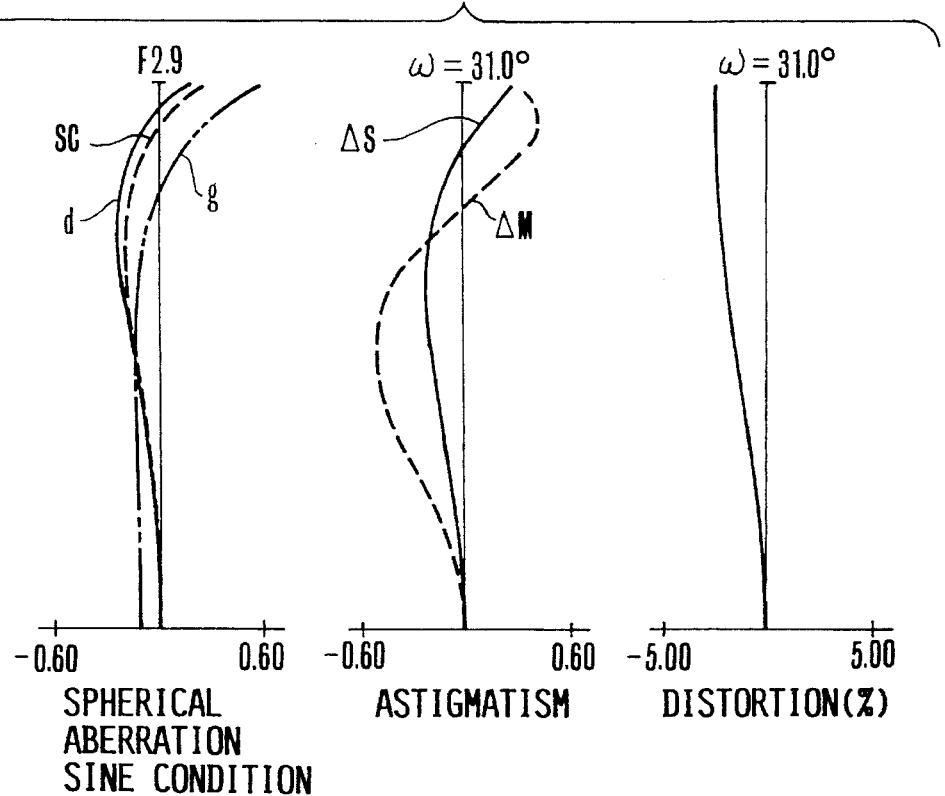
FIGS. 7(A) and 7(B) and FIGS. 10(A) and 10(B) are graphic representations of the aberrations of the examples 1 and 4 of photographic systems of the invention respectively.
Figure 7B:
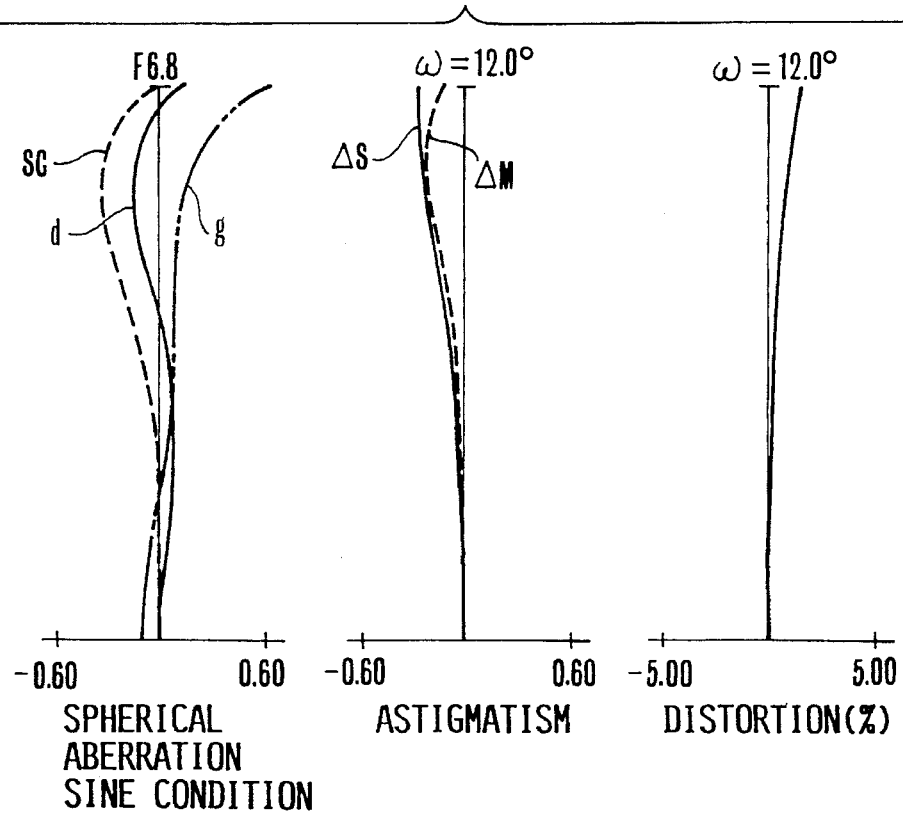
Figure 8A:
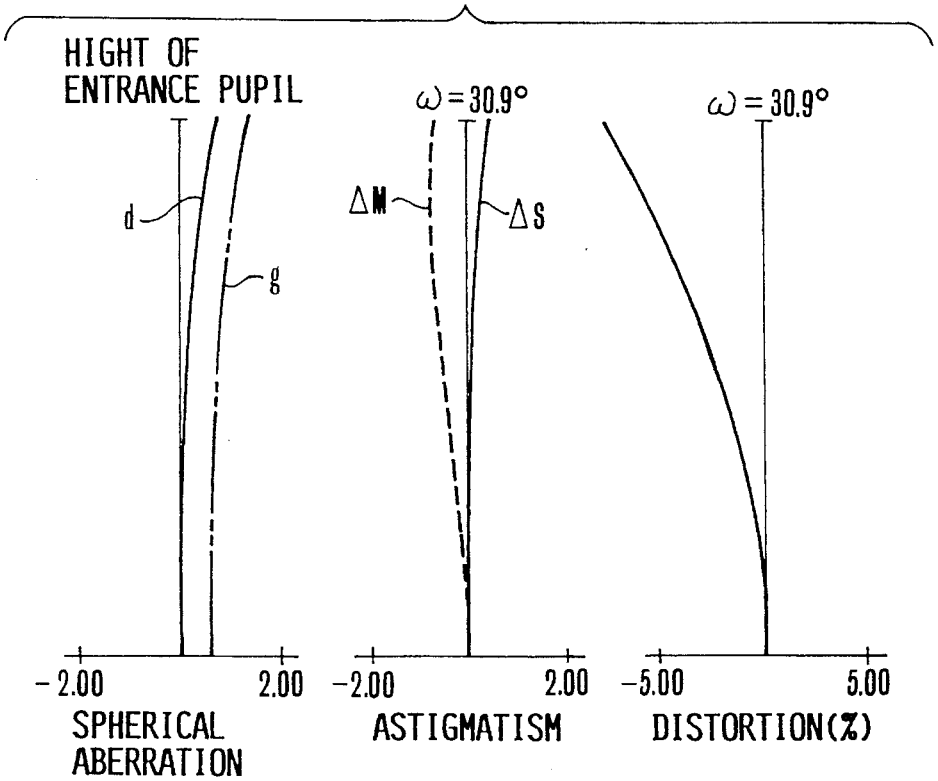
FIGS. 8(A) and 8(B), FIGS. 9(A) and 9(B) and FIGS. 11(A) and 11(B) are graphic representations of the aberrations of the examples 2, 3 and 5 of finder systems of the invention respectively.
Figure 8B:
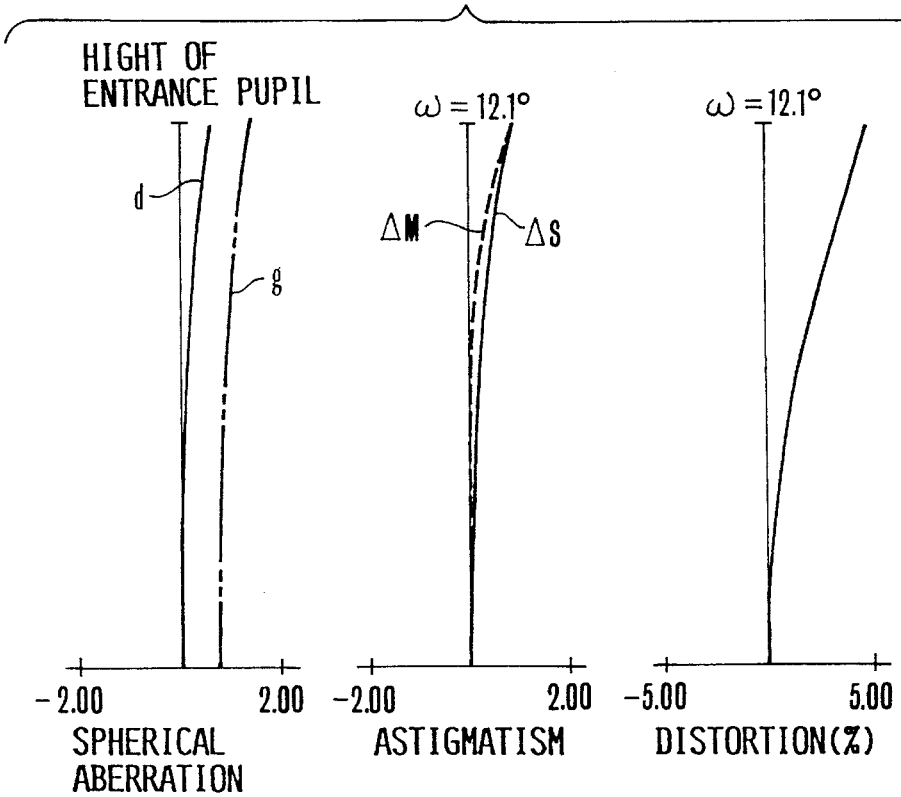
Figure 9A:
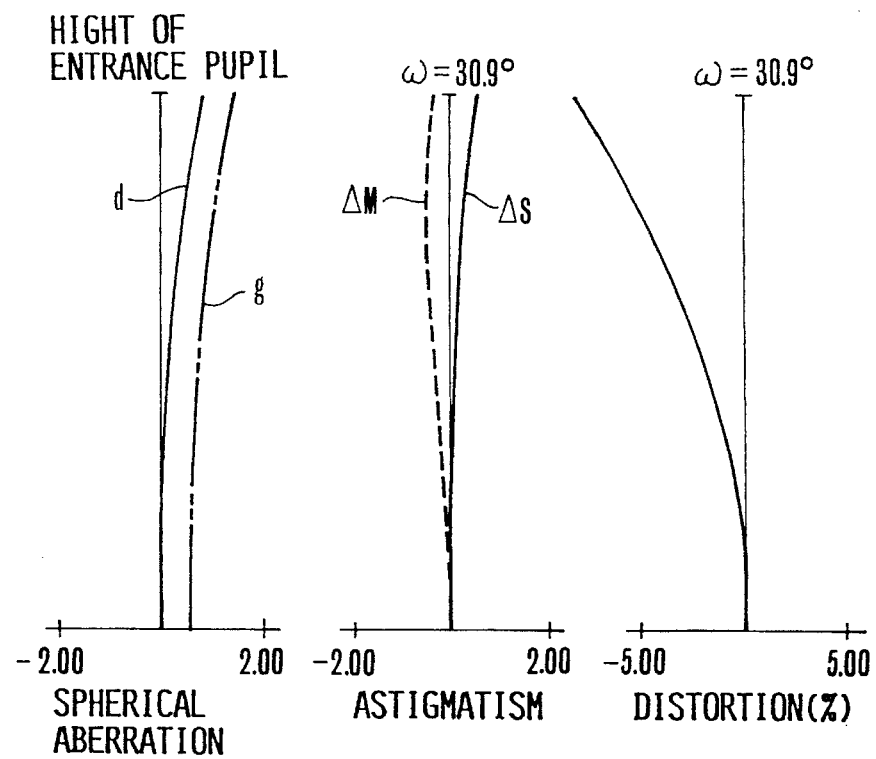
Figure 9B:
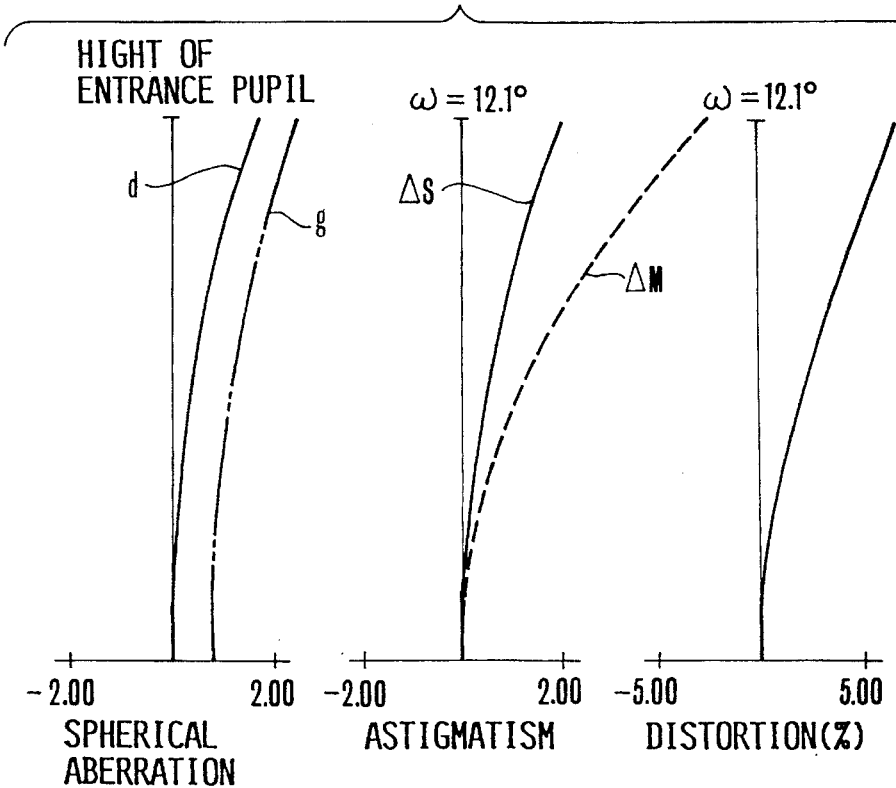
Figure 10A:
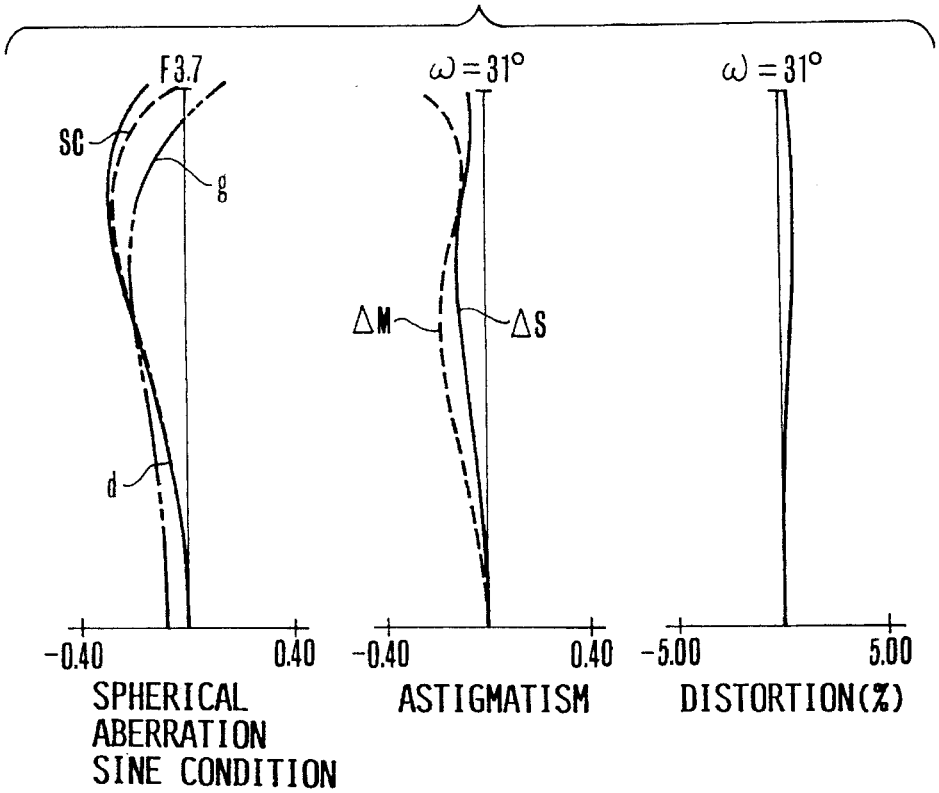
Figure 10B:
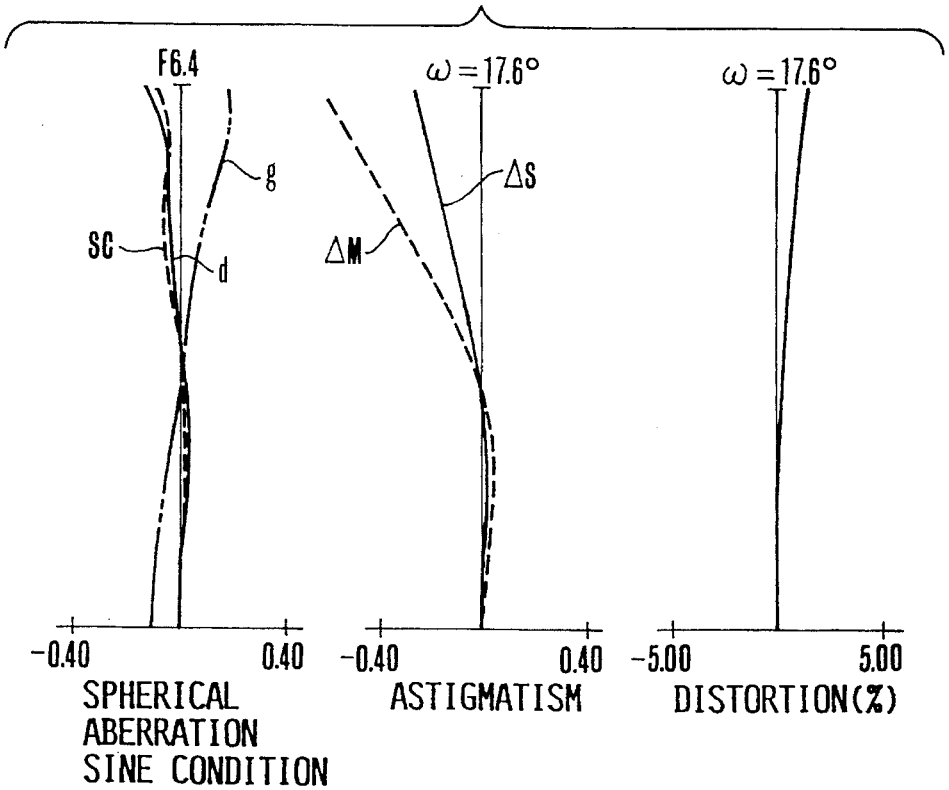
Figure 11A:
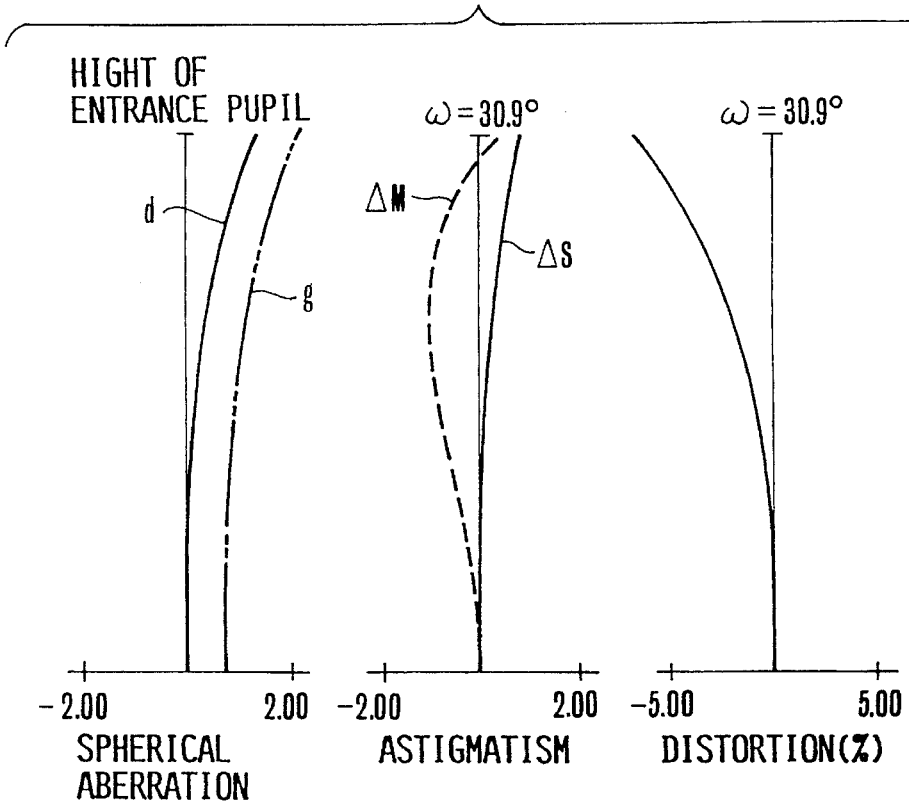
Figure 11B:
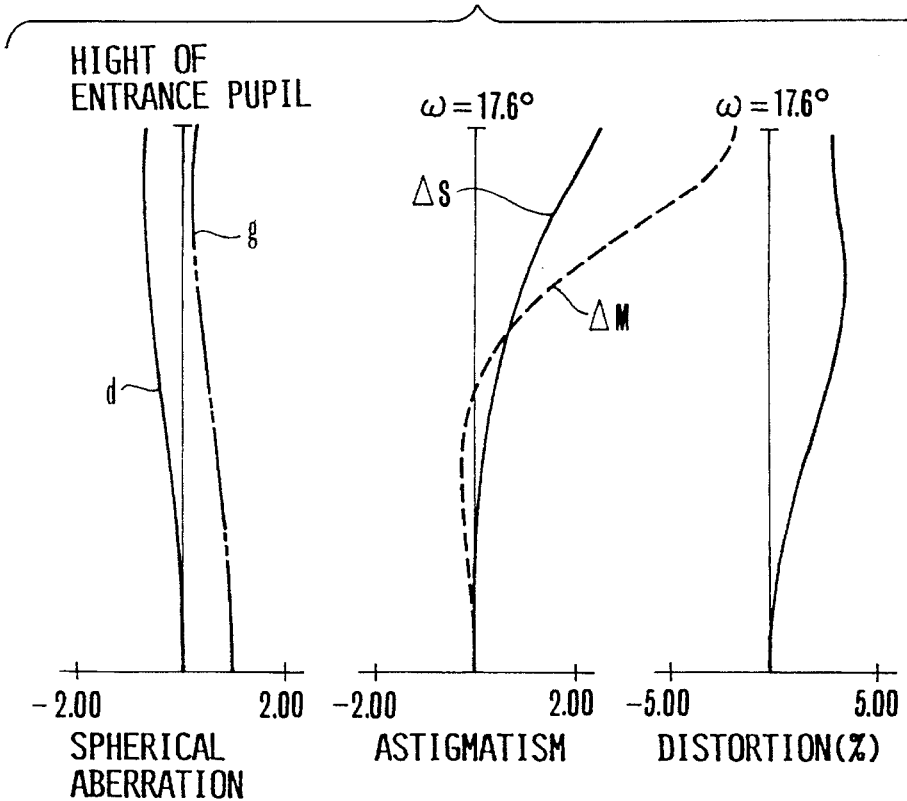

FIGS. 1(A), 1(B) and 1(C) schematically show the longitudinal section views of first, second and third embodiments of an optical system according to the invention. In FIG. 1(A), a photographic system M and a finder system F constitute a camera system.

The photographic system M comprises three lens units, of which the first lens unit L1, counting from the front, is of negative refractive power, the second lens unit L2 is of positive refractive power and the third lens unit L3 is of negative refractive power. These three lens units are axially moved independently of one another in the directions indicated by arrows to effect varying of the focal length from the wide-angle end to the telephoto end. It should be noted that in the present embodiment, the first and third lens units are moved non-linearly, while the second lens unit is moved linearly, when zooming is performed.

The finder system F comprises, from front to rear, a first finder lens unit FL1 of negative refractive power, a second finder lens unit FL2 of positive refractive power, these units FL1 and FL2 constituting an objective lens F0, a field lens FL3 which conducts the light bundle from the objective lens F0 effectively to a porro-prism P for forming an erecting non-reverse image (in FIG. 1(A), shown in the developed form as a glass block), and an eyepiece lens FL4.

In FIG. 1(A), the objective lens F0 forms a first object image on the first focal plane P1 through the field lens FL3. The first object image is converted into an erecting non-reverse image by the porro-prism P so that it is observed through the eyepiece lens FL4.

Variation of the image magnification of the finder system F is carried out in such a manner that the first finder lens unit FL1 and the second finder lens unit FL2 constituting the objective lens F0 are moved along a common optical axis, while having predetermined relationships, in association with variation of the image magnification of the photographic system M. The arrows indicate the loci of zooming movements of all the lens units from the wide-angle side to the telephoto side.

In the present embodiment, of the lens units of the photographic system M and the finder system F, the lens units of the same number, counting from the front, have their mounting mechanisms made in united form with each other, in other words, arranged to simultaneously move so that the same amount and the same direction of zooming movement are imparted to them.

It is to be noted that in a specific embodiment as illustrated in FIG. 1(A), the first lens unit L1 of the photographic system M and the first finder lens unit FL1 of the finder system F are chosen to operate with a common member of the lens mounting mechanism, so that when varying the focal length, both of the lens units L1 and FL1 are axially moved in fixed relation to each other.

By this, the variation of the image magnification of the finder system F is facilitated advantageously in accordance with variation of the focal length of the photographic system M, while still achieving simplification of the structure of the lens barrel.

In the present embodiment, the second lens unit L2 of the photographic system M and the second finder lens unit FL2 of the finder system F may otherwise be combined with each other so that both move simultaneously as zooming is performed.

It is also recommended that a secondary image forming system may be used in replacement of the porro-prism P. In this case, the light issuing from the first object image on the first focal plane P1 forms a second object image of erecting non-reverse attitude on a second focal plane P2 in front of the eyepiece lens FL4. Thus, the second object image is observed by the photographer looking through the eyepiece lens FL4.

In the present embodiment, determination of the focal lengths F1 and F2 of the first lens unit L1 and the second lens unit L2 of the photographic system M respectively, and determination of the focal lengths f1 and f2 of the first finder lens unit FL1 and the second finder lens unit FL2 of the finder system F respectively are made so as to satisfy the following conditions:

$$|1/f1|>|1/F1|,|1/f2|>1/F2 \qquad (1)$$

In such a manner, the refractive power of each one of the first and second finder lens units of the finder system F is made stronger than that of the corresponding one of the first and second lens units of the photographic system M. This provides a possibility of easily achieving an increase of the range of variation of the magnification while still achieving minimization of the size of the finder system.

In a second embodiment shown in FIG. 1(B), the first finder lens unit FL1 of the finder system F is constructed from a front lens sub-unit FL1-1 and a rear lens sub-unit FL1-2, totaling two lens sub-units. In addition, the front lens sub-unit FL1-1 has its operating mechanism arranged in fixedly secured relation to that of the first lens unit L1 of the photographic system M. Thus, both are axially moved at the same time to effect focusing.

By this, the change of the finder diopter resulting from the change of the object distance is appropriately compensated for. It is to be noted that in FIG. 1(B), reference numeral 21 represents a secondary image forming system, by which an erecting non-reverse second object image is formed on the second focal plane P2 from the first object image formed on the first focal plane P1. And, the photographer looking through the eyepiece lens FL4 observes the second object image formed on the second focal plane P2. The other features are similar to those described in connection with FIG. 1(A).

The present embodiment is well adapted to confirm the focus state by the naked eye, while focusing of the photographic system M is automatically performed by a focus detector (not shown). If this is desired, a focusing screen of diffusing characteristic known in the art, for example, a matted plate, is used as positioned in the first focal plane P1 or the second focal plane P2 of the finder system F.

It should be noted that, in the present embodiment, the refractive power of the front lens sub-unit FL1-1 is determined to be almost equal to the refractive power of the first lens unit L1 of the photographic system M.

Specifically speaking, the focal lengths f11 and F1 of the front lens sub-unit FL1-1 and the first lens unit L1 of the photographic system M respectively satisfy the following condition:

$$0.8<|f11/F1|<1.2 \qquad (2)$$

By this, focusing of the photographic system M by moving the first lens unit L1 is translated to focusing of the finder system F, and the change of the finder diopter is well compensated for.

When the condition (2) of the inequalities is violated, it becomes difficult to set the same focusing speed for the lens unit on the photographic system as that for the focusing lens unit of the finder system F. So, the structure of the lens barrel becomes complicated.

It is to be noted that in the present embodiment, instead of the front lens sub-unit FL1-1, the rear lens sub-unit FL1-2 may be chosen to be used as the focusing unit which moves in fixed relation to the first lens unit L1 of the photographic system M.

In a third embodiment shown in FIG. 1(C), a first finder lens unit 31 of positive refractive power forms a first object image on the first focal plane P1, and a secondary image forming lens unit 21 of positive refractive power forms a second object image on the second focal plane P2. That second object image is observed through the eyepiece lens FL4. As to the photographic lens system, its features are the same as those of the foregoing embodiment.

In the present embodiment, the rate of variation of the focal length of the photographic system M over the entire zooming range is made to coincide with the rate of variation of the field of view of the finder system F. For this purpose, while the secondary image forming lens unit 21 is moved along the finder optical axis by a different focus of motion from that of the second lens unit L2, the first finder lens unit 31 is made to move in fixed relation to the first lens unit L1 of the photographic system M so that the zooming direction and the zooming movement become the same. And, simplification of the moving mechanism of each lens unit is achieved.

Next, numerical examples of the photographic system and the finder system according to the invention are shown.

The numerical example 1 (FIGS. 2(A), 2(B), 7(A) and 7(B)) is a photographic system comprising a first lens unit of negative refractive power, a second lens unit of positive refractive power, and a third lens unit of negative refractive power, wherein these three lens units are moved forward to effect zooming from the wide-angle end to the telephoto end.

The numerical example 2 (FIGS. 3(A), 3(B), 8(A) and 8(B)) is a finder system comprising a first finder lens unit of negative refractive power and a second finder lens unit of positive refractive power, totaling two finder lens units, wherein both of the finder lens units are moved to vary the image magnification.

The photographic system of the numerical example 1 and the finder system of the numerical example 2 have either their first lens units, or the second lens units, designed so that the directions and amounts of their zooming movements become equal to each other in order to be able to move in the fixed relation to each other.

In the numerical example 3 (FIGS. 4(A), 4(B), 9(A) and 9(B)), the first finder lens unit of the numerical example 2 is divided into a front lens sub-unit of negative refractive power and a rear lens sub-unit of negative refractive power, totaling two lens sub-units, wherein the refractive power of the front lens sub-unit is equal to the refractive power of the first lens unit of the photographic system of the numerical example 1 so that they can move in unison when focusing.

The numerical example 4 (FIGS. 5(A), 5(B), 10(A) and 10(B)) is another photographic system comprising a first lens unit of negative refractive power, a second lens unit of positive refractive power and a third lens unit of negative refractive power, totaling three lens units, wherein these three lens units are individually moved forward to effect variation of the image magnification from the wide-angle end to the telephoto end.

The numerical example 5 (FIGS. 6(A), 6(B), 11(A) and 11(B)) is a finder system to be used in combination with the photographic system of the numerical example 4, comprising a first finder lens unit of negative refractive power and a second finder lens unit of positive refractive power, totaling two finder lens units, wherein these two finder lens units are moved to effect variation of the image magnification.

The photographic system of the numerical example 4 and the finder system of the numerical example 5 have either their first lens units, or their second lens units, so designed in the refractive power and other optical parameters that their amounts of zooming movement are equal to each other to allow them to move in unison.

In the numerical examples 1 to 5, Ri is the radius of curvature of the i-th lens surface counting from the front, Di is the i-th axial lens thickness or air separation counting from the front, and Ni and vi are the refractive index and Abbe number of the glass of the i-th lens element counting from the front respectively.

The shape of the aspheric surface is expressed in coordinates with an X-axis in the axial direction and an H-axis in the direction perpendicular to the optical axis, the direction in which light advances being taken as positive, by the following equation:

$$X = \frac{(1/R) H^2}{1 + \sqrt{1 - (H/R)^2}} + AH^2 + BH^4 + CH^6 + DH^8 + EH^{10} + A' H^1 + B' H^3 + C' H^5 + D' H^7$$

where R is the radius of curvature of the osculating sphere, and A, B, C, D and E are the aspheric coefficients.

NUMERICAL EXAMPLE 1

F = 36–102   FNo = 1:2.9–6.8   2ω = 61.7° –24.1°

| | | | |
|---|---|---|---|
| R 1 = −66.84 | D 1 = 2.2 | N 1 = 1.80518 | v 1 = 25.4 |
| R 2 = −42.68 | D 2 = 1.0 | | |
| R 3 = −49.55 | D 3 = 1.1 | N 2 = 1.88300 | v 2 = 40.8 |
| R 4 = 26.92 | D 4 = 0.15 | | |
| R 5 = 20.65 | D 5 = 3.6 | N 3 = 1.68893 | v 3 = 31.1 |
| R 6 = 101.42 | D 6 = variable | | |
| R 7 = 72.64 | D 7 = 2.8 | N 4 = 1.48749 | v 4 = 70.2 |
| R 8 = −31.39 | D 8 = 0.15 | | |
| R 9 = 15.39 | D 9 = 3.6 | N 5 = 1.66672 | v 5 = 48.3 |
| R10 = −1169.65 | D10 = 1.0 | N 6 = 1.92286 | v 6 = 21.3 |
| R11 = 54.09 | D11 = 1.8 | | |
| R12 = stop | D12 = 1.8 | | |
| R13 = −32.30 | D13 = 1.22 | N 7 = 1.75520 | v 7 = 27.5 |
| R14 = 20.99 | D14 = 1.35 | | |
| R15 = 58.07 | D15 = 2.59 | N 8 = 1.68893 | v 8 = 31.1 |
| R16 = −20.71 | D16 = variable | | |
| R17 = −33.05 | D17 = 3.16 | N 9 = 1.68893 | v 9 = 31.1 |
| R18 = −17.33 | D18 = 2.91 | | |
| R19 = −12.74 | D19 = 1.10 | N10 = 1.72916 | v10 = 54.7 |
| R20 = −70.75 | D20 = 15.41 | | |

| F | 36 | 64 | 102 |
|---|---|---|---|
| D 6 | 18.83 | 5.24 | 0.38 |
| D16 | 8.92 | 5.16 | 1.05 |

The Values of the Aspheric Coefficients:

| | | | |
|---|---|---|---|
| R 5 | A = 0 | B = −1.5 × 10⁻⁵ | C = 5.09 × 10⁻⁸ |
| | | D = −8.98 × 10⁻¹⁰ | E = 2.45 × 10⁻¹² |
| R16 | A = 0 | B = 1.41 × 10⁻⁵ | C = 1.01 × 10⁻⁸ |
| | | D = −1.44 × 10⁻⁹ | E = 1.75 × 10⁻¹¹ |
| R18 | A = 0 | B = −2.34 × 10⁻⁵ | C = 2.38 × 10⁻⁷ |
| | | D = −2.75 × 10⁻⁹ | E = 1.09 × 10⁻¹¹ |

NUMERICAL EXAMPLE 2

| | | | |
|---|---|---|---|
| R 1 = 103.73 | D 1 = 2.0 | N 1 = 1.77250 | v 1 = 49.6 |
| R 2 = 16.38 | D 2 = variable | | |
| R 3 = 89.78 | D 3 = 3.0 | N 2 = 1.51633 | v 2 = 64.1 |
| R 4 = −163.52 | D 4 = 0.2 | | |
| R 5 = 98.58 | D 5 = 3.0 | N 3 = 1.51633 | v 3 = 64.1 |
| R 6 = −22.64 | D 6 = variable | | |
| R 7 = 15.75 | D 7 = 3.8 | N 4 = 1.51633 | v 4 = 64.1 |
| R 8 = 154.69 | D 8 = 3.0 | | |
| R 9 = ∞ | D 9 = 11.0 | N 5 = 1.57090 | v 5 = 33.8 |
| R10 = ∞ | D10 = 3.0 | N 6 = 1.49171 | v 6 = 57.4 |
| R11 = −18.287 | D11 = 4.73 | | |
| R12 = ∞ | D12 = 25.0 | | |
| R13 = ∞ | D13 = 2.51 | N 7 = 1.57090 | v 7 = 33.8 |
| R14 = ∞ | D14 = 2.5 | | |
| R15 = −23.505 | D15 = 0.5 | N 8 = 1.49171 | v 8 = 57.4 |
| R16 = 18.159 | D16 = 2.5 | N 9 = 1.49171 | v 9 = 57.4 |
| R17 = ∞ | | | |

| Paraxial Magnification | 0.39 | 1.02 |
|---|---|---|
| D 2 | 29.8 | 11.35 |
| D 6 | 2.97 | 43.67 |

The Values of the Aspheric Coefficients:

| | | | |
|---|---|---|---|
| R11 | A = 0 | B = 5.11 × 10⁻⁴ | C = −3.3 × 10⁻⁶ |
| R16 | A = 0 | B = −3.3 × 10⁻⁵ | C = 5 × 10⁻⁸ |

NUMERICAL EXAMPLE 3

| | | | |
|---|---|---|---|
| R 1 = 103.73 | D 1 = 2.0 | N 1 = 1.77250 | ν 1 = 49.6 |
| R 2 = 31.14 | D 2 = 2.0 | | |
| R 3 = 100.00 | D 3 = 2.0 | N 2 = 1.77250 | ν 2 = 49.6 |
| R 4 = 26.62 | D 4 = variable | | |
| R 5 = 89.78 | D 5 = 3.0 | N 3 = 1.51633 | ν 3 = 64.1 |
| R 6 = −163.52 | D 6 = 0.2 | | |
| R 7 = 98.58 | D 7 = 3.0 | N 4 = 1.51633 | ν 4 = 64.1 |
| R 8 = −22.64 | D 8 = variable | | |
| R 9 = 15.75 | D 9 = 3.8 | N 5 = 1.51633 | ν 5 = 64.1 |
| R10 = 154.68 | D10 = 3.0 | | |
| R11 = ∞ | D11 = 11.0 | N 6 = 1.57090 | ν 6 = 33.8 |
| R12 = ∞ | D12 = 3.0 | N 7 = 1.49171 | ν 7 = 57.4 |
| R13 = −18.28 | D13 = 4.73 | | |
| R14 = ∞ | D14 = 25.0 | N 8 = 1.57090 | ν 8 = 33.8 |
| R15 = ∞ | D15 = 2.51 | | |
| R16 = ∞ | D16 = 2.5 | N 9 = 1.49171 | ν 9 = 57.4 |
| R17 = −23.505 | D17 = 0.5 | | |
| R18 = 18.159 | D18 = 2.5 | N10 = 1.49171 | ν10 = 57.4 |
| R19 = ∞ | | | |

| Paraxial Magnification | 0.39 | 1.02 |
|---|---|---|
| D 4 | 28.66 | 10.21 |
| D 8 | 2.97 | 43.67 |

The values of the Aspheric Coefficients:

| R13 | A = 0 | B = 5.12 × $10^{-4}$ | C = −3.31 × $10^{-6}$ |
|---|---|---|---|
| R18 | A = 0 | B = −3.3 × $10^{-5}$ | C = 5 × $10^{-8}$ |

NUMERICAL EXAMPLE 4

F = 36.2–67.9 FNo = 1:3.7–6.4 2ω = 61.7° −35.3°

| | | | |
|---|---|---|---|
| R 1 = −41.97 | D 1 = 1.1 | N 1 = 1.69680 | ν 1 = 55.5 |
| R 2 = 33.05 | D 2 = 0.1 | | |
| R 3 = 19.72 | D 3 = 2.4 | N 2 = 1.68893 | ν 2 = 31.1 |
| R 4 = 36.35 | D 4 = variable | | |
| R 5 = 21.83 | D 5 = 3.67 | N 3 = 1.62280 | ν 3 = 57.0 |
| R 6 = −39.04 | D 6 = 0.15 | | |
| R 7 = 12.80 | D 7 = 2.09 | N 4 = 1.57135 | ν 4 = 53.0 |
| R 8 = 27.43 | D 8 = 0.91 | | |
| R 9 = −40.62 | D 9 = 2.59 | N 5 = 1.84666 | ν 5 = 23.9 |
| R10 = 13.85 | D10 = 0.78 | | |
| R11 = 21.04 | D11 = 2.50 | N 6 = 1.68893 | ν 6 = 31.1 |
| R12 = −23.56 | D12 = 1.20 | | |
| R13 = stop | D13 = variable | | |
| R14 = −27.74 | D14 = 2.87 | N 7 = 1.76182 | ν 7 = 26.6 |
| R15 = −12.50 | D15 = 1.44 | | |
| R16 = −11.38 | D16 = 1.00 | N 8 = 1.83400 | ν 8 = 37.2 |
| R17 = −37.44 | D17 = 2.80 | | |
| R18 = −13.28 | D18 = 1.20 | N 9 = 1.60311 | ν 9 = 60.7 |
| R19 = −22.70 | | | |

| F | 36.2 | 67.9 |
|---|---|---|
| D 4 | 6.41 | 1.52 |
| D13 | 8.84 | 2.31 |

The value of the Aspheric Coefficients:

| R 3 | A = 0 | B = −1.44 × $10^{-5}$ | C = −1.93 × $10^{-7}$ |
|---|---|---|---|
| | | D = 2.39 × $10^{-10}$ | E = −4.74 × $10^{-12}$ |
| | | A' = −1.04 × $10^{-5}$ | B' = 5.8 × $10^{-7}$ |
| | | C' = 3.8 × $10^{-9}$ | D' = 3.3 × $10^{-11}$ |

NUMERICAL EXAMPLE 5

| | | | |
|---|---|---|---|
| R 1 = −15.62 | D 1 = 1.2 | N 1 = 1.49171 | ν 1 = 57.4 |
| R 2 = 19.89 | D 2 = variable | | |
| R 3 = 32.52 | D 3 = 3.8 | N 2 = 1.49171 | ν 2 = 57.4 |
| R 4 = −11.00 | D 4 = variable | | |
| R 5 = 33.97 | D 5 = 3.8 | N 3 = 1.49171 | ν 3 = 57.4 |
| R 6 = −16.67 | D 6 = 0.9 | | |
| R 7 = 235.48 | D 7 = 13.5 | N 4 = 1.57090 | ν 4 = 33.8 |

-continued

| | | | |
|---|---|---|---|
| R 8 = ∞ | D 8 = 1.0 | | |
| R 9 = ∞ | D 9 = 33.0 | N 5 = 1.57090 | ν 5 = 33.8 |
| R10 = −24.25 | D10 = 2.0 | | |
| R11 = 24.25 | D11 = 2.5 | N 6 = 1.49171 | ν 6 = 57.4 |
| R12 = −316.27 | D12 = 0.7 | | |

| Paraxial Magnification | 0.58 | 1.03 |
|---|---|---|
| D 2 | 8.50 | 3.62 |
| D 4 | 17.55 | 38.03 |

The Values of the Aspheric Coefficients:

| R 3 | A = 0 | B = −1.5 × $10^{-4}$ | C = 1.65 × $10^{-6}$ |
|---|---|---|---|
| | | D = −1.21 × $10^{-8}$ | E = 2.9 × $10^{-10}$ |
| R 6 | A = 0 | B = 1.47 × $10^{-4}$ | C = −8.05 × $10^{-7}$ |
| | | D = −1.06 × $10^{-8}$ | E = 1.34 × $10^{-10}$ |

According to the invention, each lens unit of the finder system and each lens unit of the photographic system are defined as described in the foregoing, and part of lens unit of the photographic system and part of lens unit of the finder system are integrally moved under a predetermined condition along an optical axis. Therefore, it is possible to provide a camera system having a finder system of the external type of simple form in which the structure of the lens mounting and that of the lens driving means are prevented from becoming complicated.

What is claimed is:

1. A camera system comprising:

photographic lens means for transmitting light used in a photographing operation, having a plurality of lens units, wherein more than one of said lens units moves along a photographic optical axis during zooming;

finder optical means for transmitting light to be viewed by a user, having a plurality of lens units, wherein more than one of said lens units moves along a finder optical axis during zooming;

means for connecting at least one of said lens units of said photographic lens means and one of said lens units of said finder optical means so that said at least one of the lens units of said photographic lens means and said at least one of the lens units of said finder optical means are displaced by the same amount during zooming, wherein said photographic lens means has, from front to rear, at least a first lens unit having a negative refractive power and a second lens unit having a positive refractive power, and wherein said finder optical means has, from front to rear, at least a first finder lens unit having a negative refractive power and a second finder lens unit having a positive refractive power;

means for causing the amount of displacement during zooming of said first lens unit and said first finder lens unit to be the same, wherein said first lens unit, when focusing, moves along an optical axis and said first finder lens unit has a movable lens arranged during focusing to move in unison with said first lens unit, wherein the focal lengths of said first lens unit and said movable lens denoted by F1 and f11, respectively, satisfy the following condition:

0.8<|f11/F1|<1.2

; and means for causing the amount of displacement during zooming of said second lens unit and said second finder lens unit to be the same.

2. A system according to claim 1, wherein said connecting means comprises means for moving in unison the lens units of said photographic lens means and the lens units of said finder optical means which are the same number of lens units from the object side of said system.

3. A system according to claim 1, said system satisfying the following conditions:

$$|1/f_1|>1/F_1|1/f_2|>1/F_2$$

where F1 and F2 are focal lengths of said first and second lens units respectively and f1 and f2 are focal lengths of said first and second finder lens units.

4. A system according to claim 1, wherein said photographic lens means has, from front to rear, at least a first lens unit having a negative refractive power and a second lens unit having a positive refractive power, wherein said finder optical means has, from front to rear, at least a first finder lens unit having a positive refractive power to form a primary image and a second finder lens unit having a positive refractive power to form a secondary image, and wherein said system further comprises means for causing the displacement during zooming of said first lens unit and said first finder lens unit to be the same.

5. A system according to claim 4, wherein said second lens unit and said second finder lens unit are moved by different loci of movement from each other to effect focusing.

6. A system according to claim 5, wherein said photographic lens means has a third lens unit having a negative refractive power and arranged on the image side of said second lens unit to move when zooming, and wherein said finder optical means further has a fixed eyepiece lens.

7. A camera system comprising:

photographic lens means for transmitting light used in a photographing operation having a plurality of lens units, wherein more than one of said lens units moves along a photographic optical axis during zooming;

finder optical means for transmitting light to be viewed by a user, having a plurality of lens units, wherein more than one of said lens units moves along a finder optical axis during zooming; and means for connecting at least one of said lens units of said photographic lens means and one of said lens units of said finder optical means so that said at least one of the lens units of said photographic lens means and said at least one of the lens units of said finder optical means are displaced by the same amount during zooming, wherein said photographic lens means has, from front to rear, at least a first lens unit having a negative refractive power and a second lens unit having a positive refractive power, and wherein said finder optical means has, from front to rear, at least a first finder lens unit having a positive refractive power to form a primary image and a second finder lens unit having a positive refractive power to form a secondary image, and wherein said system further comprises means for causing the displacement during zooming of said first lens unit and said first finder lens unit to be the same, wherein said system satisfies the conditions:

$$|1/f_1|>1/F_1|1/f_2|>1/F_2$$

where $F_1$ and $F_2$ are focal lengths of said first lens unit and said second lens unit of said photographic lens means, respectively, and $f_1$ and $f_2$ are focal lengths of said first finder lens unit and said second finder lens unit, respectively.

8. A camera system comprising:

photographic lens means for transmitting light used in a photographing operation comprising a first lens unit and a second lens unit, wherein said first and second lens units move along a photographic optical axis during zooming;

finder optical means for transmitting light to be viewed by a user, including a first finder lens unit, which moves during zooming, a re-imaging lens for re-imaging an image formed by said first finder lens unit, and an eyepiece lens unit for observing the image formed by the re-imaging lens; and means for connecting said first lens unit of said photographic lens means and said first finder lens unit of said finder optical means so that said first lens unit of said photographic lens means and said first finder lens unit of said finder optical means are displaced by the same amount during zooming;

said system satisfying the conditions:

$$|1/f_1|>1/F_1|1/f_2|>1/F_2$$

wherein $F_1$ and $F_2$ are focal lengths of said first lens unit and said second lens unit of said photographic lens means, respectively, and $f_1$ and $f_2$ are focal lengths of said first finder lens unit and said re-imaging lens, respectively.

* * * * *

UNITED STATES PATENT AND TRADEMARK OFFICE
CERTIFICATE OF CORRECTION

PATENT NO. : 5,576,779
DATED : November 19, 1996
INVENTOR(S) : KEIJI IKEMORI, ET AL.

It is certified that error appears in the above-indentified patent and that said Letters Patent is hereby corrected as shown below:

IN THE DRAWINGS:

SHEET 9, FIGURE 8(A),

"HIGHT" should read --HEIGHT--.

SHEET 9, FIGURE 8(B),

"HIGHT" should read --HEIGHT--.

SHEET 10, FIGURE 9(A),

"HIGHT" should read --HEIGHT--.

SHEET 10, FIGURE 9(B),

"HIGHT" should read --HEIGHT--.

SHEET 12, FIGURE 11(A),

"HIGHT" should read --HEIGHT--.

SHEET 12, FIGURE 11(B),

"HIGHT" should read --HEIGHT--.

UNITED STATES PATENT AND TRADEMARK OFFICE
CERTIFICATE OF CORRECTION

PATENT NO. : 5,576,779  
DATED : November 19, 1996  
INVENTOR(S) : Keiji Ikemori, et al.

Page 2 of 3

It is certified that error appears in the above-indentified patent and that said Letters Patent is hereby corrected as shown below:

COLUMN 3:

Line 59, "$|1/f1|>|1/F1|\,1/f2>1/F2$" should read  
-- $|1/f1| > |1/F1|$  
$1/f2 > 1/F2$ --.

COLUMN 9:

Line 7, "$|1/f_1|>|1/F_1|\,1/f_2>1/F_2$" should read  
-- $|1/f1| > |1/F1|$  
$1/f2 > 1/F2$ --.

UNITED STATES PATENT AND TRADEMARK OFFICE
CERTIFICATE OF CORRECTION

PATENT NO. : 5,576,779
DATED : November 19, 1996
INVENTOR(S) : KEIJI IKEMORI, ET AL.

It is certified that error appears in the above-indentified patent and that said Letters Patent is hereby corrected as shown below:

COLUMN 10:

Line 13, "$|1/f_1|>|1/F_1|1/f_2>1/F_2$" should read
--$|1/f_1| > |1/F_1|$
$1/f_2 > 1/F_2$--; and Line 42, "$|1/f_1|>|1/F_1|1/f_2>1/F_2$" should read
--$|1/f_1| > |1/F_1|$
$1/f_2 > 1/F_2$--.

Signed and Sealed this

Second Day of September, 1997

Attest:

*Attesting Officer*

BRUCE LEHMAN

*Commissioner of Patents and Trademarks*